United States Patent
Park et al.

(10) Patent No.: US 7,885,738 B2
(45) Date of Patent: Feb. 8, 2011

(54) METHOD, MEDIUM, AND APPARATUS FOR SELF-PROPELLED MOBILE UNIT WITH OBSTACLE AVOIDANCE DURING WALL-FOLLOWING ALGORITHM

(75) Inventors: Jun-ho Park, Hwaseong-si (KR); Jay-woo Kim, Yongin-si (KR); Jong-chan Won, Gwangmyeong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1054 days.

(21) Appl. No.: 11/283,831

(22) Filed: Nov. 22, 2005

(65) Prior Publication Data

US 2006/0229774 A1 Oct. 12, 2006

(30) Foreign Application Priority Data

Nov. 26, 2004 (KR) .................. 10-2004-0098092

(51) Int. Cl.
*G01C 22/00* (2006.01)

(52) U.S. Cl. .................... 701/23; 700/245; 701/301

(58) Field of Classification Search ............ 701/23, 701/26, 301; 700/245; 318/568.2
See application file for complete search history.

(56) References Cited

U.S. PATENT DOCUMENTS

| | | | | |
|---|---|---|---|---|
| 5,001,635 A | * | 3/1991 | Yasutomi et al. | 701/26 |
| 5,378,969 A | * | 1/1995 | Haikawa | 318/568.12 |
| 5,548,511 A | * | 8/1996 | Bancroft | 701/23 |
| 5,920,172 A | | 7/1999 | Bauer | |
| 6,459,955 B1 | * | 10/2002 | Bartsch et al. | 700/245 |
| 6,574,536 B1 | * | 6/2003 | Kawagoe et al. | 701/23 |
| 6,901,624 B2 | * | 6/2005 | Mori et al. | 15/319 |
| 6,984,952 B2 | * | 1/2006 | Peless et al. | 318/580 |
| 7,031,805 B2 | * | 4/2006 | Lee et al. | 700/245 |
| 7,120,519 B2 | * | 10/2006 | Okabayashi et al. | 700/254 |

(Continued)

FOREIGN PATENT DOCUMENTS

JP 05-216534 8/1993

(Continued)

OTHER PUBLICATIONS

Japanese Office Action dated Jul. 8, 2008, issued in corresponding Japanese patent application No. 2005-342577 (2 pgs.).

*Primary Examiner*—Mark Hellner
*Assistant Examiner*—Helal A Algahaim
(74) *Attorney, Agent, or Firm*—Staas & Halsey LLP

(57) ABSTRACT

A method, medium, and apparatus of a self-propelled mobile unit with obstacle avoidance during wall-following. In the self-propelled mobile unit, a carrying unit may move the mobile unit by using a transmitted power, and a sensor unit can detect an obstacle and a wall, which may be respectively placed in front of and to the side of the mobile unit, with respect to a moving direction of the carrying unit. A controller may direct the carrying unit by generating a path along which the carrying unit moves according to a detection result from the sensor unit. Accordingly, the controller can direct the carrying unit to move while maintaining a predetermined distance (within a predetermined range) from the wall. If the sensor unit detects an obstacle, the controller directs the carrying unit to move in an obstacle free direction.

19 Claims, 10 Drawing Sheets

U.S. PATENT DOCUMENTS

| | | | |
|---|---|---|---|
| 7,155,308 B2 * | 12/2006 | Jones | 700/245 |
| 7,173,391 B2 * | 2/2007 | Jones et al. | 318/568.12 |
| 7,188,000 B2 * | 3/2007 | Chiappetta et al. | 700/245 |
| 7,218,994 B2 * | 5/2007 | Kanda et al. | 700/245 |
| 7,251,853 B2 * | 8/2007 | Park et al. | 15/319 |
| 7,320,149 B1 * | 1/2008 | Huffman et al. | 15/320 |
| 7,539,563 B2 * | 5/2009 | Yang et al. | 701/24 |
| 2001/0047225 A1 * | 11/2001 | Shimoike et al. | 700/250 |
| 2002/0016649 A1 * | 2/2002 | Jones | 700/245 |
| 2003/0120389 A1 * | 6/2003 | Abramson et al. | 700/245 |
| 2004/0158358 A1 * | 8/2004 | Anezaki et al. | 700/264 |
| 2004/0244138 A1 * | 12/2004 | Taylor et al. | 15/319 |
| 2005/0010331 A1 * | 1/2005 | Taylor et al. | 700/245 |

FOREIGN PATENT DOCUMENTS

| | | |
|---|---|---|
| JP | 09-206258 | 8/1997 |
| JP | 09-230937 | 9/1997 |
| JP | 2000-039918 | 2/2000 |
| JP | 2000-181541 | 6/2000 |
| JP | 2000-214927 | 8/2000 |
| JP | 2002-312035 | 10/2002 |
| JP | 2002-318618 | 10/2002 |
| JP | 2003-280737 | 10/2003 |
| JP | 2004-133846 | 4/2004 |
| JP | 2004-194751 | 7/2004 |
| JP | 2004-325020 | 11/2004 |
| KR | 10-2004-0062041 | 7/2004 |

* cited by examiner

METHOD, MEDIUM, AND APPARATUS FOR SELF-PROPELLED MOBILE UNIT WITH OBSTACLE AVOIDANCE DURING WALL-FOLLOWING ALGORITHM

CROSS-REFERENCE TO RELATED APPLICATIONS

This application claims priority from Korean Patent Application No. 10-2004-0098092 filed on Nov. 26, 2004, in the Korean Intellectual Property Office, the disclosure of which is incorporated herein by reference in its entirety.

BACKGROUND OF THE INVENTION

1. Field of the Invention

Embodiments of the present invention relate to a method, medium, and apparatus for a self-propelled mobile unit with obstacle avoidance during wall-following algorithm.

2. Description of the Related Art

Many home appliances operate at a fixed position. However, if the home appliances were not fixed, their operations could be performed more efficiently. For example, in the case of a humidifier, an air cleaner, or a vacuum cleaner it maybe desirable or beneficial for these devices to perform their operations while moving. Thus, many self-propelled mobile unit mechanisms have been proposed.

For example, U.S. Pat. No. 649,754 discusses a motion mechanism for allowing a self-propelled mobile unit to recognize a position and move thereto, through the use of an installed recognition mark on a ceiling. Here, a position in space can be recognized, but it is difficult to avoid obstacles. Also, when the self-propelled mobile unit moves under a table it cannot detect the overhead mark and thus may have navigation problems.

Meanwhile, U.S. Pat. No. 5,920,172 discusses a path finding method for a self-propelled mobile unit. Here, when the self-propelled mobile unit encounters an object, it turns a predetermined angle and then returns to a point of departure. If the object is a table and a gap between legs is wide, the self-propelled mobile unit may move under the table. Only when the object has a polyhedral structure, such as a box or a sphere, can the self-propelled mobile unit detect and avoid the object.

However, the gap between legs of the chair, table, or desk, in offices or homes, may typically be wide, such that they may not be recognized as obstacles. Accordingly, there is a need for a method of avoiding such obstacles during a wall-following operations.

SUMMARY OF THE INVENTION

It is an aspect of the present invention to provide a method, medium, and apparatus for a self-propelled mobile unit with an obstacle avoidance capability during a wall-following algorithm.

It is another aspect of the present invention to provide a method, medium, and apparatus capable of avoiding an object, such as a table or a desk, which have typically been difficult to detect.

To achieve the above and/or other aspects, embodiments of the present invention include a self-propelled mobile unit, a carrying unit to move the mobile unit, a sensor unit to detect an obstacle in front of the mobile unit and a wall to a side of the mobile unit, both with respect to a direction of motion of the carrying unit, and a controller to control the carrying unit movement of the mobile unit by generating a path along which the carrying unit is controlled to move, according to a detection result of the sensor unit, wherein the controller directs the carrying unit to move the mobile unit while controlling a distance between the mobile unit and the wall, and wherein the controller directs the carrying unit to move the mobile unit in a direction free of obstacles if the sensor unit detects an obstacle.

The controller may direct the carrying unit to move the mobile unit while controlling the distance to be within a predetermined range.

The mobile unit may further include an operation executing unit to perform at least one of a humidifying operation, an air cleaning operation, and a vacuum cleaning operation.

In addition, the sensor unit may include an obstacle sensor unit to detect the obstacle in front of the mobile unit, a wall sensor unit to detect the wall, and a sensor signal processor to process signals from the obstacle sensor unit and the wall sensor unit, including information about the detected obstacle.

The sensor unit may further include an upward sensor unit to detect the obstacle, existing upward with respect to the direction of motion of the carrying unit and the upward sensor, and wherein the controller may direct the carrying unit to move in a direction different from the direction of motion of the carrying unit corresponding to the detected obstacle if a height of the obstacle detected by the upward sensor unit is lower than a height of the mobile unit. The sensor unit may further include a collision sensor unit to detect a collision of the mobile unit with the obstacle, and wherein the controller may direct the carrying unit to move the mobile unit in a direction different from the direction of motion of the carrying unit corresponding to the detected obstacle if the collision is detected by the collision sensor unit.

The sensor unit may further include a crash sensor unit to detect an unevenness of a surface, upon which the carrying unit travels, in front of the mobile unit with respect to the direction of motion of the carrying unit, and the controller may direct the carrying unit to move the mobile unit in a direction different from the direction of motion of the carrying unit corresponding to the detected obstacle, with the detected obstacle being the unevenness of the surface. The sensor unit may further include a window frame sensor unit to detect a window existing in front of or to a side of the mobile unit, with respect to the direction of motion of the carrying unit, and wherein the may controller use a detected position of a detected window to decide if the detected window should be considered an obstacle or a wall, and directs movement of the carrying unit accordingly.

The controller may include an obstacle avoidance unit to generate a direction and a distance that the mobile unit is controlled to move to avoid the obstacle, a wall-following unit to generate a direction and a distance that the carrying unit is controlled to move to maintain a predetermined distance from the wall, and a path generator to respectively combine the direction and distance generated by the obstacle avoidance unit and the direction and distance generated by the wall-following unit to generate a control signal to control movement of the carrying unit. Here, the controller may further include an exception processor to generate a direction of motion and distance for finding a wall when the sensor unit does not detect the wall, wherein the path generator produces a control signal to control movement of the carrying unit corresponding to the generated direction of motion and distance for finding the wall.

The controller may control the carrying unit or the sensor unit to rotate when the obstacle is detected by the sensor unit, the sensor unit may scan for obstacles within a predetermined range from a position after the rotation of the carrying unit or sensor unit, and the controller may direct the carrying unit to move in a direction corresponding to the position after the rotation of the carrying unit or sensor when no obstacles are detected by the scan for obstacles.

The carrying unit may include a driving unit driven by power transmitted from a power source to control the moving direction of the mobile unit, a traveling unit driven by a driving force transmitted from the driving unit to move the mobile unit in the moving direction controlled by the driving unit, and a distance calculating unit to calculate a distance traveled by the traveling unit. Here, the driving unit may include a steering unit to control the moving direction, and a power transmission unit to receive the driving force from the power source.

To achieve the above and/or other aspects, embodiments of the present invention include a method of self-propelling a mobile unit with obstacle avoidance during wall-following, the method including detecting for a wall near the mobile unit, approaching the detected wall, moving the mobile unit in a first moving direction while maintaining the mobile unit at a distance from the wall, within a predetermined range, scanning for an obstacle in the first moving direction, turning the mobile unit in a first turning direction if the obstacle is detected, and moving the mobile unit in the first turning direction if the first turning direction is obstacle free.

The scanning for the obstacle may include determining whether a height of the obstacle is lower than a height of the mobile unit. In addition, the detecting of the obstacle existing in the path of the mobile unit may include detecting a window existing in the first moving direction of the mobile unit. The moving of the mobile unit in the obstacle free direction may include turning the mobile unit in a second turning direction, and scanning for obstacles within a predetermined range in the second turning direction.

The detecting of the obstacle in the first moving direction may include detecting the obstacle in a front upward direction with respect to the moving direction of the mobile unit. The detecting of the obstacle existing in the first moving direction may include detecting a window, as the obstacle.

The method may further include moving the mobile unit a predetermined distance and scanning for the wall again if the wall is not detected. In addition, the method may include repeating the scanning for the wall and the approaching of the wall after moving the mobile unit in the first turning direction. Still further, the method may inlcude repeating the approaching of the wall, after moving the mobile unit in the first turning direction, based on a determination of a position of the repeated approached wall being based on a known direction of movement of the mobile unit and calculating a distance moved in the first turning direction.

To achieve the above and/or other aspects, embodiments of the present invention include at least one medium including computer readable code to implement embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, in which.

DETAILED DESCRIPTION OF THE PREFERRED EMBODIMENTS

Figure 1:
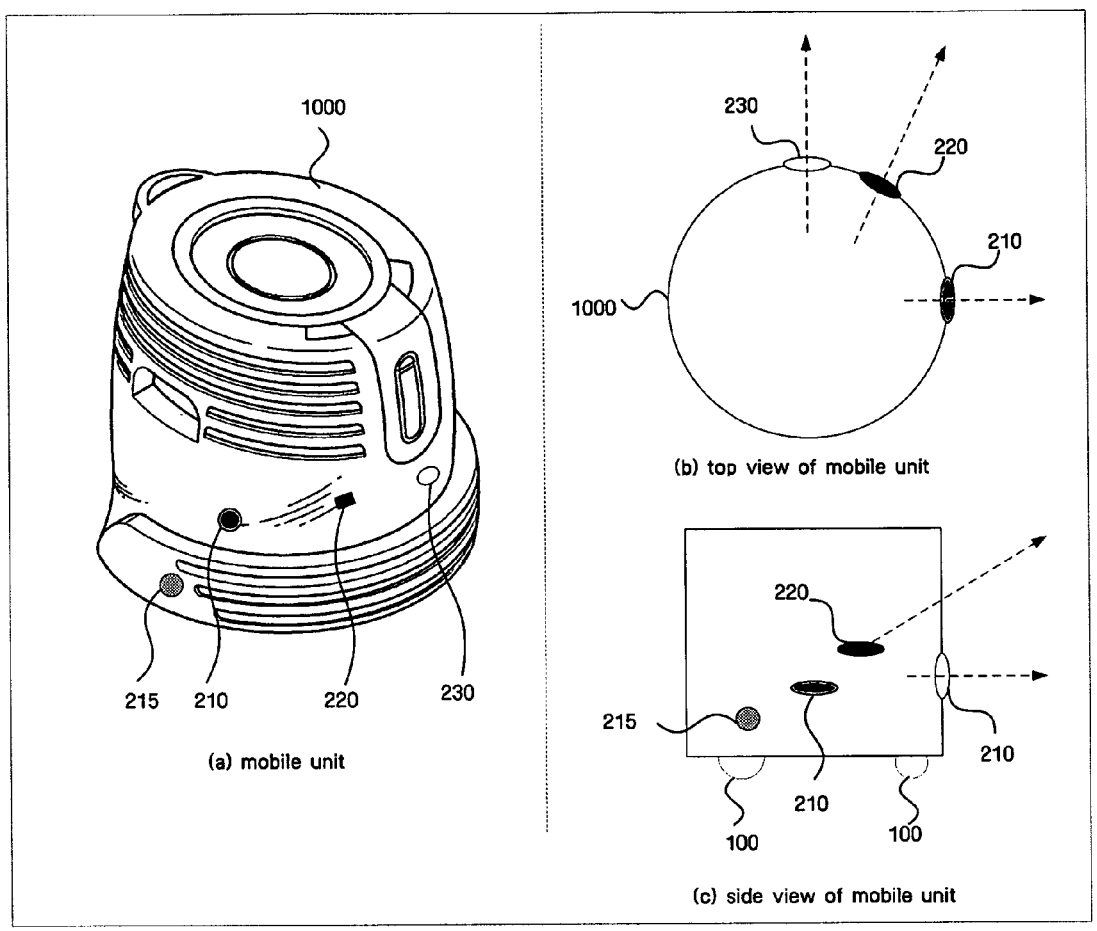
FIG. 1 illustrates a self-propelled mobile unit, in accordance with an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates several views of a self-propelled mobile unit, in accordance with an embodiment of the present invention. As merely an example, the self-propelled mobile unit 1000 may include a mobile humidifier, cleaner, air cleaner, etc., noting that embodiments of the present invention are not limited thereto. A carrying unit 100 may be mounted along a bottom of the mobile unit 1000, with the carrying unit 100 being shown in view (c) of FIG. 1. The mobile unit 1000 may have three sensor elements, including a wall sensor unit 210 for detecting a wall, an obstacle sensor unit 230 for detecting an object in the front of the mobile unit, and an upward sensor unit 220 for detecting an obstacle, such as a table or a chair that may exist above the traveling path of the mobile unit. View (b) of FIG. 1 is a top view of the mobile unit, and view (c) of FIG. 1 is a side view of the mobile unit. Illustrated arrows in views (b) and (c) of FIG. 1 denote directions in which the sensors units 210, 220, and 230 may detect objects.

The wall sensor unit 210 may detect a wall, so that the mobile unit can follow the wall while maintaining a constant distance from the wall, for example. The upward sensor unit 220 may detect whether or not an obstacle exists above a traveling direction of the mobile unit. In the case of a table or a desk being present, the gap between the legs of the table or desk may be so wide that the table or desk may not be detected as an obstacle, in which case the mobile unit may collide with the table or desk, for example. In order to prevent such a collision, the upward sensor unit 220 may detect objects that reside below the tip of the mobile unit, i.e., objects that are not sufficiently high to permit the mobile unit to pass underneath. The obstacle sensor unit 230 may detect objects in front of the mobile unit (with respect to the traveling direction), for example.

The mobile unit 1000 shown in FIG. 1 may further include a window frame sensor 215, shown in views (a) and (c) of FIG. 1, for detecting a window frame. If an infrared sensor is used, a window may be difficult to detect because of the glass of the window. Accordingly, if the wall sensor unit 210 is not an ultrasonic sensor, or if the position of the wall sensor unit 210 is so high that detection of the window frame may become a problem, the window frame sensor 215 may be used to detect a low window frame, for example, and then perform an operation of avoiding the obstacle or following the wall. Here, the window frame sensor 215 may accept detected objects as obstacles or walls, for example.

As illustrated in FIG. 1, the upward sensor unit 220 may detect an object disposed at a right upper position, for example, from the traveling direction of the mobile unit 1000, according to an embodiment of the present invention. Since the obstacle sensor unit 230 may detect an obstacle disposed in the front of the mobile unit 1000, for example, within a predetermined range, the upward sensor part 220 may be designed to detect an object in an oblique direction, slightly deviated from the sensing direction of the obstacle sensor unit 230, according to an embodiment of the present invention. However, embodiments of the present invention are not limited to these positions, and, as further example, various embodiments with different sensor positions will be described in greater detail below.

Figure 2:
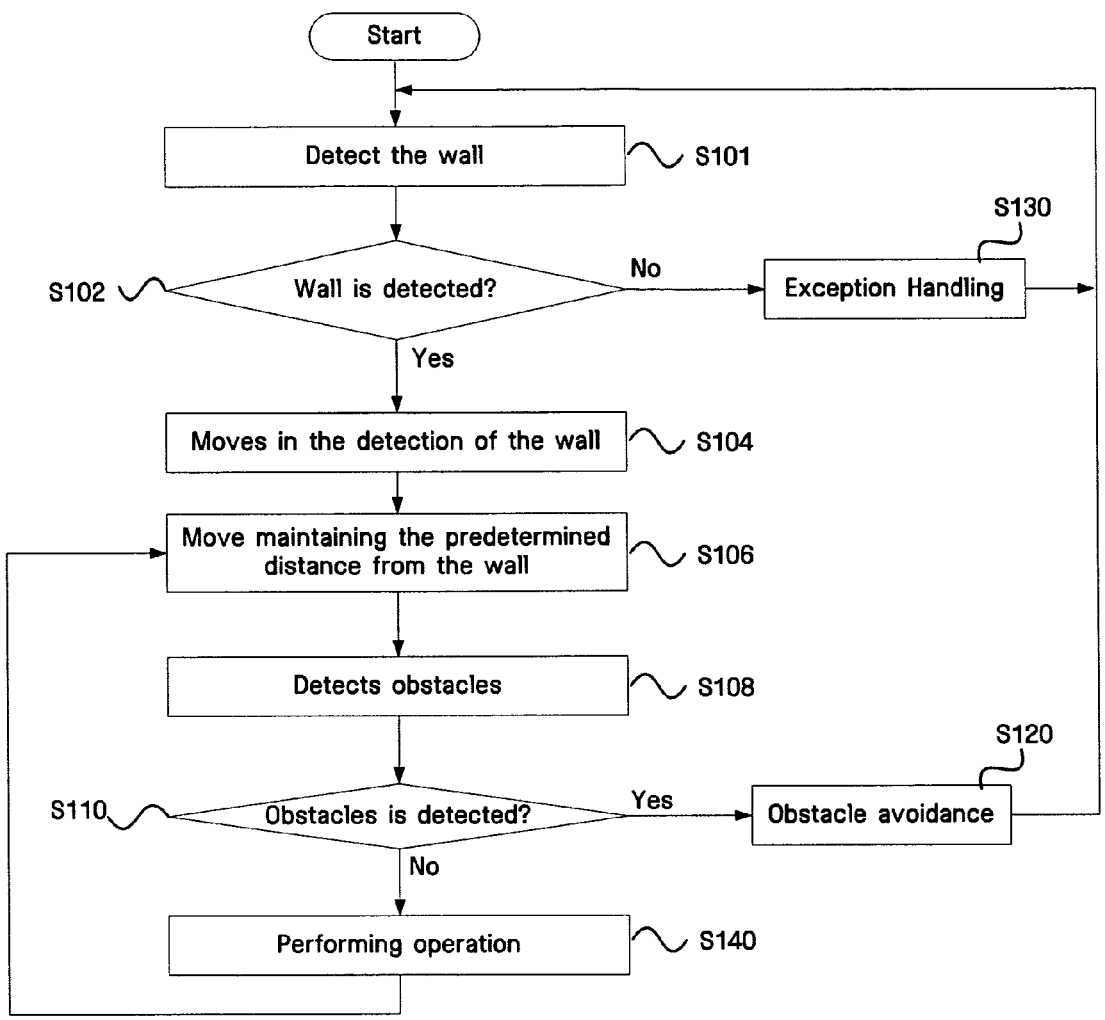
FIG. 2 is a flowchart illustrating an operation for following a wall and avoidance of an obstacle, in accordance with an embodiment of the present invention.

FIG. 2 is a flowchart illustrating a process of following a wall and avoiding an obstacle, in accordance with an embodiment of the present invention. The self-propelled mobile unit may start to operate when it receives a move command or power is supplied. By using a remote control, a button, or a timer, a user may turn on the mobile unit or give a move command to the stopped mobile unit, for example. In the case of the timer, above operations may be carried out by an internal scheduler, for example. Also, when the mobile unit is desired to operate, for example, when a temperature is above or below a predetermined value, or when the humidity or air pollution level is within or outside a predetermined range, the mobile unit may similarly automatically operate. In automatic operation, the mobile unit may be self propelled. If the user gives the move command, the mobile unit may detect the wall (S101). Here, the wall sensor unit 210, for example, may be used to detect the wall. The wall sensor unit 210 may calculate the distance to an object by using an ultrasonic or infrared sensor, for example, but it is not limited thereto. If a wall is determined to have been detected, in operation S102, the mobile unit may approach the wall (S104). Conversely, if the wall has not been determined to have been detected in operation S102, the mobile unit may perform exception handling, for example, an operation of finding the wall (S130).

If a wall is detected by the wall sensor unit 210, for example, the mobile unit moves in the direction of the wall (S104). If the wall sensor unit 210 and an obstacle sensor unit 230 are disposed at the positions shown in FIG. 1, the obstacle sensor unit 230 may be used to approach the wall. For example, if the wall sensor unit 210 is used to detect the wall, in a particular direction, the mobile unit may turn 90 degrees so as to move in the corresponding direction and may then detect the wall by using the obstacle sensor unit 230. Since an obstacle may exist during the approach to the wall, an additional operation of avoiding the obstacle may be performed. This operation may be performed in an obstacle avoidance operation S120, which will be described in greater detail below with reference to FIG. 3. When the mobile unit is close to the wall, e.g., within a predetermined distance, the mobile unit may move, while maintaining the predetermined distance from the wall (S106). The predetermined distance may also change depending on the operations the mobile unit is desired to perform. For example, when the mobile unit performs a cleaning operation, the mobile unit may approach the wall up to a minimum distance from the wall, so as to clean as close to the wall as possible. Also, the distance from the wall may be flexibly adjusted so as to clean a place away from the wall, for example. Accordingly, it can be said that the distance from the wall is a distance suitable for the mobile unit to perform the desired operation. As another example, the mobile unit may move while maintaining a distance far enough from the wall that the wall does not get wet due to moisture discharged from a rotative outlet, e.g., during a humidification operation. During such a humidification operation, an obstacle may be detected and the obstacle avoidance operation may be required so as not to collide with the obstacle.

While the mobile unit is moving, the wall sensor unit 210, for example, may be used to maintain the predetermined distance from the wall, and the obstacle sensor unit 230 may be used to detect obstacles in the path of the mobile unit (S108). If an obstacle is determined to exist in operation S110, the operation of avoiding the obstacle may be performed (S120). The operation of avoiding the obstacle may not be to avoid the obstacle by determining the obstacle's size, but rather, to move a predetermined distance in a direction where there is no obstacle and then approach the wall again, for example.

The conventional method is to merely avoid the obstacle. However, when the mobile unit encounters a thin object, such as a leg of a chair or a table, the mobile unit may not detect the other leg, resulting in a collision with the other leg. Also, conventional techniques use an infrared sensor that may not detect window glass.

Thus, in operation S120, in order to prevent such a collision, when an obstacle is detected, the mobile unit may move in a different direction, and then attempt to detect the wall again and again move toward the wall. In this case, if thin objects are arranged in parallel, e.g., legs of a chair, desk, or table, the mobile unit can avoid one object and prevent a collision with the other object.

After the obstacle avoidance, the previous distance from the wall may have changed and it may be difficult to follow the wall because the mobile unit may now be in a position farther from the wall. Therefore, the operation of checking the wall position may be performed (S101). Alternatively, without repeating the wall detection operation, the mobile unit can approach the wall by calculating the direction and distance the mobile unit moved in order to avoid the obstacle, and then calculate the position of the wall that was a movement reference.

If the wall is not detected, an exception operation S130 may be performed. Exception operation (S130) may be specifically for the case where the wall is not detected. Since the mobile unit may be surrounded with walls, the mobile unit can, typically, encounter the wall in any direction. Accordingly, while moving straight in a specific direction, the mobile unit's obstacle sensor unit 230 may be used to detect an object disposed in front of the mobile unit and that object may, thus, be a wall. Also, even though the wall may not be detected at a current position, the wall may be detected when the mobile unit moves from a current position. Therefore, after the mobile unit moves at least a predetermined distance, for example, from the current position, the mobile unit may again perform the wall detection operation. Here, the distance moved may be greater than the wall and obstacle sensor's range. It may also be preferable to move above a range because the wall may not exist within the detectable range of the sensor units.

Figure 3:
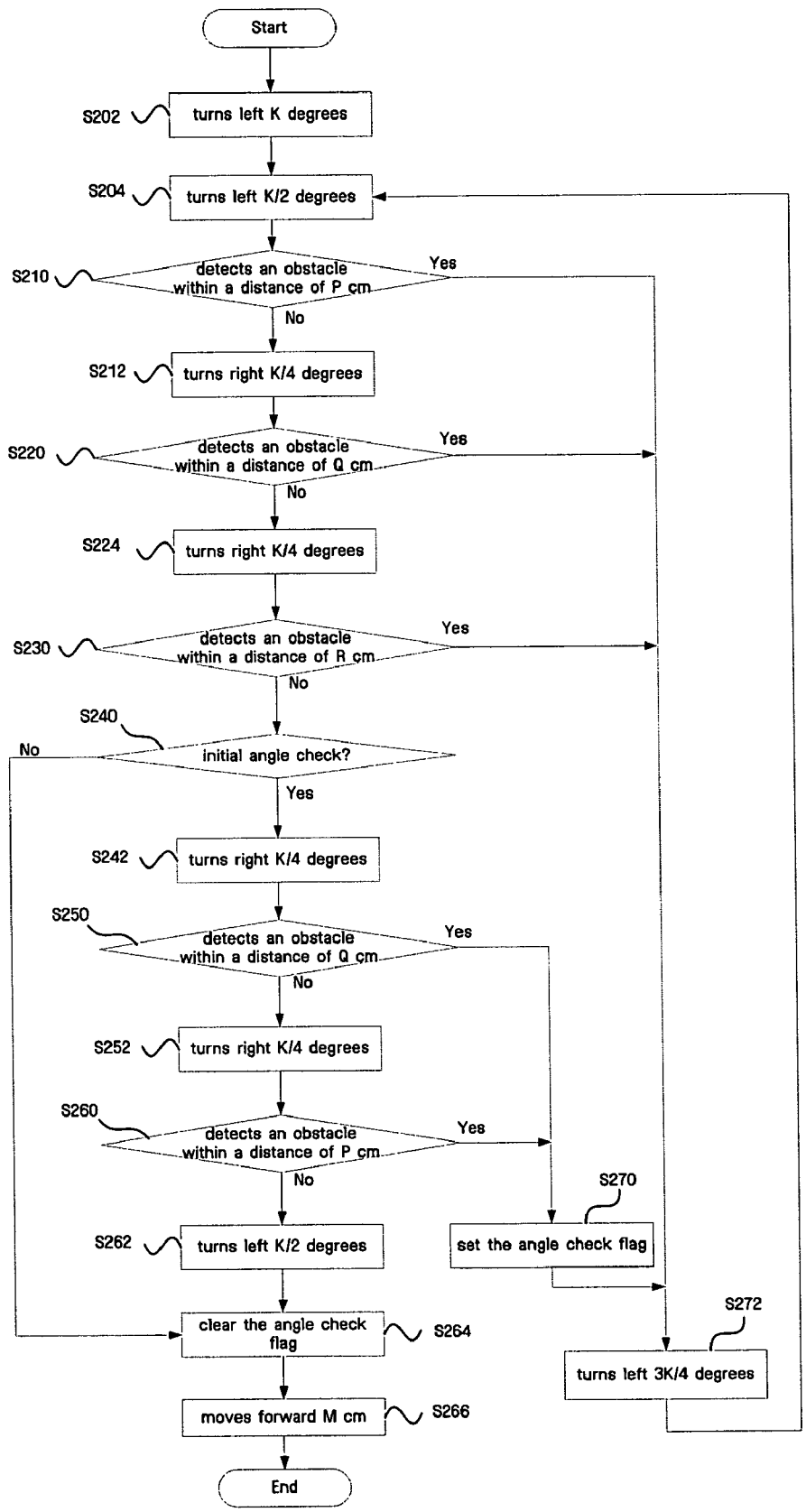
FIG. 3 is a flowchart illustrating an operation for avoiding an obstacle, in accordance with an embodiment of the present invention.

FIG. 3 is a flowchart illustrating an avoiding operation for an obstacle, in accordance with an embodiment of the present invention. Thus, in FIG. 3, operation S120 of FIG. 2 has been illustrated in greater detail. Referring to FIG. 3, if an obstacle in a moving direction is detected, the mobile unit may turn K degrees in a right or left direction. The direction may depend on the direction in which the mobile unit follows the wall. For example, if the mobile unit moves in a counterclockwise direction it may turn left. The embodiment of FIG. 3 has been set forth as the case where the wall sensor unit 210, for example, is attached to a right side of the mobile unit and the mobile unit follows the wall in a counterclockwise direction. Therefore, the mobile unit turns left K degrees. If the moving direction is determined, the mobile unit may detect whether or not an obstacle exists within a predetermined distance in five directions, for example. Here, such examples may include moving left K/4 degrees, left K/2 degrees, straight, right K/4 degrees and right K/2 degrees, with respect to the moving direction. Scanning for an obstacle in five directions is merely an example of an embodiment and the number of the directions may be changed depending on the situations.

In operation S112 of FIG. 2, if an obstacle is determined to have been detected, the mobile unit may turn left K degrees so as to avoid the obstacle and move a predetermined distance. However, after the mobile unit turns it may scan again for obstacles, because another obstacle may exist. Accordingly, the mobile unit may scan the range from left K/2 degrees to right K/2 degrees (e.g., operations S204 to S260).

The mobile unit may detect whether an obstacle exists toward the left (e.g., operations S204 to S230).

The mobile unit may turns left K/2 degrees (S204). The angle of K/2 degrees is merely an example, and any angle is available if it is suitable to detect an obstacle within the left K degrees. Then, the mobile unit may detect whether an obstacle exists within a distance of P cm (S210). The distance of P cm may be a distance that allows the mobile unit to pass even if an obstacle exists. In the obstacle avoidance operation, the mobile unit may not continue to go straight, but may move a predetermined distance. Thus, the distance of P cm may be variable and depend on the size of the mobile unit and the set moving distance, for example, e.g., when the mobile unit has a radius of 50 cm and is set to move 20 cm, an obstacle that is 1 meter away from the mobile unit would not influence the motion of the mobile unit. Therefore, the mobile unit would only need to detect whether an obstacle exists within a distance of 20 cm. If an object does not exist within the range of K/2 degrees, the mobile unit may turn right K/4 degrees (S212). If an obstacle exists within the range of K/2 degrees, the process may proceed to the obstacle avoidance operation S272.

Again, the angle of K/4 degrees is merely exemplary, and embodiments of the present invention are not limited thereto. Next, the mobile unit may detect whether an obstacle exists within a distance of Q cm, so as to know if an obstacle exists when the mobile unit moves another predetermined distance. If an obstacle is detected, the process again may proceeds to the obstacle avoidance operation S272.

The mobile unit may then turn right K/4 degrees (S224). Again, the mobile unit scans for an obstacle within a distance of R cm (S230). If an object exists, the process proceeds to the obstacle avoidance operation S272. If an object does not exist, the process may proceed to operation S240.

The operations S204 to S230 are operations of detecting whether an object exists to the left of the mobile unit relative to the direction of motion. Similarly, operations S242 to S260 are operations for detecting whether an object exists to the right of the mobile unit. As can be seen from FIG. 3, if the mobile unit cannot move due to an obstacle, the process proceeds to the operation S270 of setting an angle check flag. It was determined in operations S204 to S230 that an obstacle does not exist on the left. Therefore, when the mobile unit turns left again in operation S272, the operation of scanning for obstacles to the left can be omitted. When the mobile unit turns left in operations S270 to S272, that range has already been scanned. Therefore, operation S240 is not an initial angle check as no obstacle, exists on the right and left. Thus, the mobile unit can clears an angle check flag (S264) and then moves M cm. The obstacle avoidance operation is finished and the may proceed to operation S101 of FIG. 2.

If operation S240 is an initial angle check, the mobile unit may turn right K/4 degrees to scan for obstacles (S242). Then, the mobile unit checks whether an obstacle exists within a distance of Q cm (S250). Here, the symmetrical relationship of operations 250 and 220 should be noted, though this is merely an example and the algorithm can equally be asymmetric. If an obstacle exists, the mobile unit may set the angle check flag for operations S204 to S230. Then, the mobile unit may again turn left a predetermined angle (S272), for example, 3K/4 degrees.

If no obstacle is detected, the mobile unit turns right K/4 degrees (S252). Then, the mobile unit scans for an obstacle within a distance of P cm (S260). If an obstacle exists, the mobile unit may set the angle check flag for operations S204 to S230. Then, the mobile unit again turns left a predetermined angle (S272).

Here, if an obstacle does not exist, then, the mobile unit turns left K/2 degrees (S262), and clears the angle check flag (S264). Then, the mobile unit moves forward M cm (S266), for example. The value of M cm may be proportional to the size of the mobile unit and may also be can be changed depending on any of the values of P, Q and R, for example. If the mobile unit detects an obstacle during a wall-following, the avoidance direction and distance may be changed depending on differing embodiments and are not limited to the flowchart of FIG. 3. Also, K degrees, K/2 degrees and K/4 are merely example angles for detecting an obstacle based on divided ranges, with embodiments of the present invention not being limited thereto. For example the mobile unit may turn 90 degrees, avoid an obstacle, and scan within a range of 40 degrees. Thus, the range may be divided by any factor. Here, merely for simplification of explanation, In FIG. 3, the scanning in the K/2 and K/4 ranges were chosen so as to equally detect the obstacle.

Although the above scanning has been explained as being done in five directions, embodiments of the present invention are not limited thereto. As shown in FIG. 3, the existence of the obstacle can be checked within a predetermined range based on several directions from the obstacle avoidance direction. However, as another example, obstacle scanning can also be done by a rotating method of calculating the distance to an obstacle and scanning a predetermined angle.

In addition to scanning while being stopped, the mobile unit may detect possible collisions while moving. In the case where a sensor unit is configured with two or more sensors, or a sensor unit is independently rotatable, the mobile unit may scan for an obstacle within a predetermined range by rotating the sensor unit, without any movement of the carrying unit, or both movement operations may be implemented.

As described above in FIG. 3, obstacle scanning may be done within a specific range, but a condition that no obstacle must exist in the direction of motion is not necessary. For example, if the mobile unit is set to move 30 cm, an obstacle that is 1 meter away from the mobile unit may not be considered in range.

Figure 4:
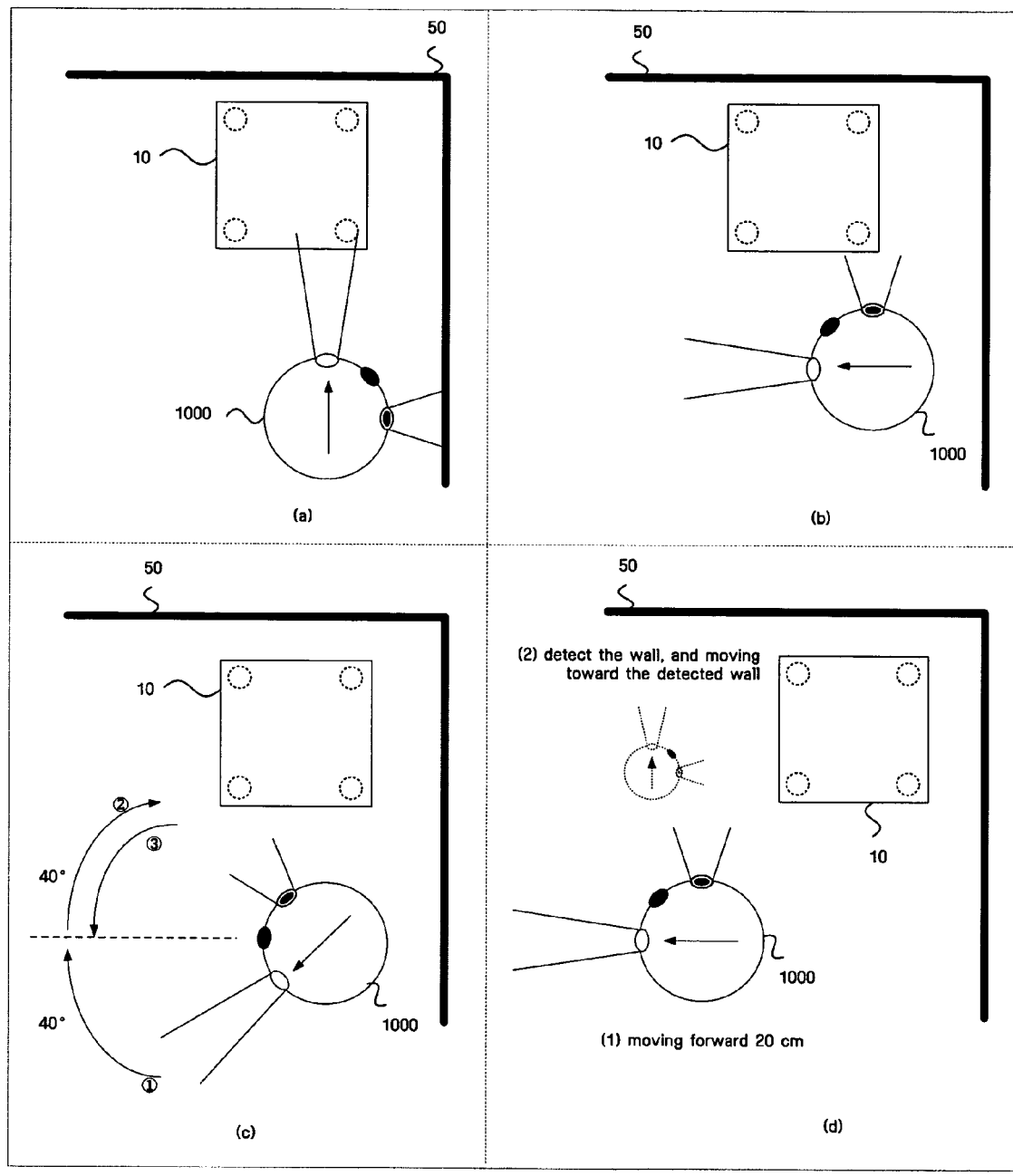
FIG. 4 illustrates an avoiding operation for an obstacle based on an obstacle avoidance method, in accordance with an embodiment of the present invention.

FIG. 4 illustrates an avoiding of an obstacle, through several views, in accordance with an embodiment of the present invention. In view (a) of FIG. 4, the self-propelled mobile unit 1000 may follow the wall by using the obstacle sensor unit 230 and the wall sensor unit 220. The obstacle sensor unit 230 and the wall sensor unit 220 may be installed on the front and on the right of the mobile unit 1000, respectively, for example. An illustrated arrow in view (a) of FIG. 4 represents the direction of motion of the mobile unit 1000.

In view (a) of FIG. 4, when the mobile unit 1000 is moving and maintaining a constant, for example, distance from the wall, the mobile unit 1000 may detect a chair 10. Since the chair 10 is an obstacle, the mobile unit 1000 may turn left K degrees (operation S202 of FIG. 3), as illustrated in view (b) of FIG. 4. Here, in this embodiment, the angle K was set to 90 degrees for simplification of explanation. Then, as shown in view (c) of FIG. 4, the mobile unit 1000 scans for other obstacles in another potential direction of motion so as to avoid additional obstacles. In order to perform additional operations, such as operations S204 to S230 of FIG. 3, the mobile unit 1000 may turn left 40 degrees, as illustrated in view (c) of FIG. 4. In view (c) of FIG. 4, the mobile unit 1000 turns as illustrated by arrow ① and scans for obstacles in the new direction of motion (e.g., operations S204 to S230 of FIG. 3). Then, the mobile unit 1000 may turns as illustrated by arrow ② and scans for obstacles on the right within a predetermined range (e.g., operations S242 to S260 of FIG. 3). If an obstacle does not exist, the mobile unit 1000 turns as illustrated by arrow ③, which is a desired direction for the situation illustrated in view (b) of FIG. 4. Then, as shown in view (d) of FIG. 4, the mobile unit 1000 may then move a predetermined distance (e.g., operation S266 of FIG. 3). View (d) of FIG. 4 further illustrates a movement of 20 cm in portion (1) and the movement past chair 10 in portion (2). After the mobile unit 1000 avoids chair 10, the mobile unit 1000 can detect a wall again and move toward it (e.g., operations S101 to S104).

As noted above, the mobile unit 1000 may alternatively find the wall by calculating the position of the previous target wall, instead of detecting the wall again after movement. Here, after encountering the obstacle, a controller can store the distance and direction of motion and pass this information to a calculation unit. In this way the position of the previous wall can be known.

Figure 5:
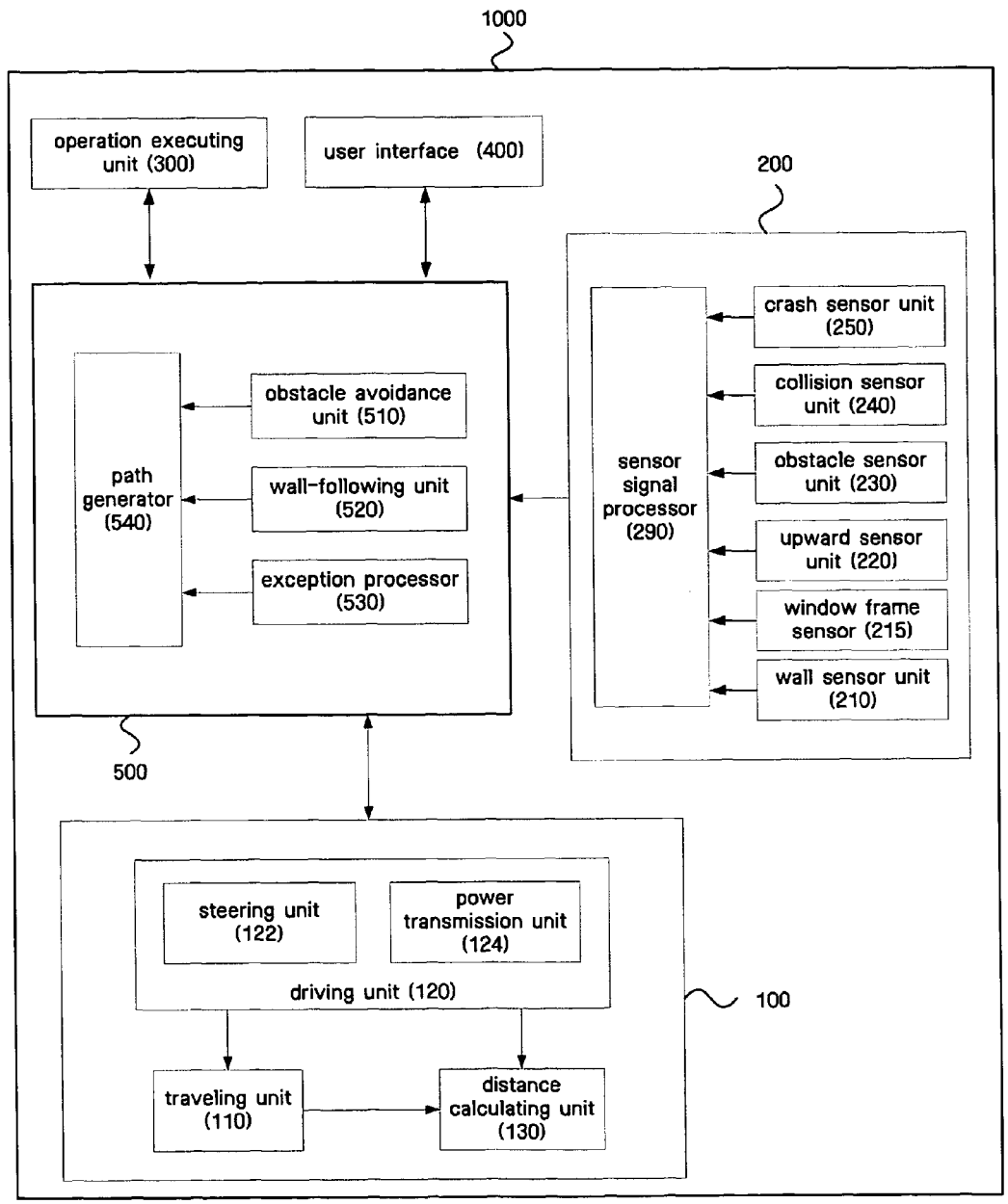
FIG. 5 illustrates a self-propelled mobile unit, in accordance with an embodiment of the present invention.

FIG. 5 illustrates a self-propelled mobile unit, in accordance with another embodiment of the present invention.

Referring to FIG. 5, the mobile unit 1000 may include a carrying unit 100, a sensor unit 200, an operation executing unit 300, a user interface 400, and a controller 500.

The sensor unit 200 may include a wall sensor unit 210, an upward sensor unit 220, an obstacle sensor unit 230, a collision sensor unit 240, a crash sensor unit 250, a window frame sensor 215, and a sensor signal processor, for example. The wall sensor unit 210 may detects a wall so that the mobile unit 1000 can maintain at least a predetermined distance, for example, from the wall. The wall sensor unit 210 may detect walls by transmitting an ultrasonic wave or an infrared ray and calculating the arrival time of the reflected wave, for example. Ultrasonic, infrared, or laser sensors are merely exemplary embodiments and other types of sensors can alternatively be used.

When the wall sensor unit 210 is installed at a position higher than a window frame, or when an infrared signal (which can pass through glass) is used, the window frame sensor unit 215 may be used to detect a window frame. As shown in FIG. 1, the window frame sensor unit 215 may be installed at a low position and detect a low window frame. The function of the window frame sensor unit 215 may also be performed by the wall sensor unit 210. In addition, the window frame sensor unit 215 may be installed below the obstacle sensor unit 230 and detect a window that exists in the traveling direction. In this case, the window frame sensor unit 215 may detect a window that is not detected by the obstacle sensor unit 230.

The upward sensor unit 220 is provided to prevent a collision with a high object, such as a table or a chair, which is not detected by the obstacle sensor unit 230 while the mobile unit 1000 is moving. In general, even though the obstacle sensor unit 230 detects the supports, such pillars or legs of a table or chair, if the gap between the supports is sufficiently wide the obstacle sensor unit 230 may still determine that no obstacle exists. Thus, the mobile unit may move under the table or chair. If the table or the chair is low, there is a possibility of collision. Therefore, the upward sensor unit 220 may detect whether an object exists above the intended path of the mobile unit. The upward sensor unit 220 can also use an ultrasonic wave, an infrared ray, a laser, or others, for example.

The obstacle sensor unit 230 may detect whether an obstacle exists within a predetermined range, to prevent the mobile unit 1000 from colliding with the obstacle while following a wall. If an object exists within this range, the obstacle avoidance operation may be performed.

The collision sensor unit 240 may detect an actual or potential collision with other objects while the mobile unit 1000 is moving. Here, the collision sensor unit 240 may be configured with small switches installed on the outside of the mobile unit 1000. The small switches generate on/off signals when they come into contact with an object.

The mobile unit 1000 may further include a crash sensor unit 250. The crash sensor unit 250 may halt further movement of the mobile unit 1000 when it detects a recessed area, a steep slope, or a step, for example. Here, the crash sensor unit 250 may detect the recessed area by checking the uniformity of the signal reflected from the ground. The crash sensor unit 250 may also detect a protruded portion in the scanning area.

The sensor signal processor 290 may be used to transmit the signals received from the respective sensor units to the controller 500. For example, the obstacle sensor unit 230 may generate a signal when it detects an object within 50 cm of the mobile unit. In this case, the sensor signal processor 290 may convert the signal into digital information that is then sent to the controller 500.

The controller 500 may further determine what action to take based on this information. For example, if there is an object in front of the mobile unit, the obstacle avoidance unit 510 of the controller 500 may direct the mobile unit to avoid the obstacle. The flowchart of FIG. 3 illustrates an example of a basic algorithm for an obstacle avoidance unit, noting that alternative algorithms are available. If an obstacle exists in the traveling direction, the obstacle avoidance unit 510 may cause the mobile unit to move a predetermined distance in an obstacle free direction. The command to move in a specific direction may be transmitted to the path generator 540, and the carrying unit 100 may be actuated based on this information, which in turn moves the mobile unit 1000 a predetermined distance in a predetermined direction. Similarly, if the obstacle sensor unit 210 fails to detect a present window, the window frame sensor 215 may detect the window frame as an obstacle and thus the mobile unit 1000 can avoid the window frame.

A wall-following unit 520 may be used to allow the mobile unit 1000 to follow a wall while maintaining a constant distance, for example, from the wall by analyzing signals that are continuously generated from the wall sensor 210. If the mobile unit deviates from a predetermined range, the wall-following unit 520 may send a signal to the path generator 540 to move toward or away from the wall. In the case where there is a window in the wall, the wall sensor unit 210 may not detect the window, but the window frame sensor unit 215 would detect the window frame as the wall, thereby still achieving enabling wall-following.

The exception processor 530 may provide a mechanism that allows the mobile unit 1000 to move to find the wall when a wall is not detected. For example, if the wall is not detected at a specific position, the exception processor 530 may cause the mobile unit 1000 to move forward a predetermined distance in one direction so that the mobile unit 1000 can detect the wall. The obstacle sensor unit 230 may also be used to find the wall. Since the surrounding area where the mobile unit operates may be closed, walls could be considered to always exist, and if the mobile unit 1000 moves in any direction it should encounter a wall.

Based on the information provided from the obstacle avoidance unit 510, the wall-following unit 520, and the exception processor 530, the path generator 540 may control the motion of the mobile unit 1000 by transmitting direction, distance, and velocity information to the carrying unit 100.

The carrying unit 100 may thereby make the mobile unit move based on information output from the controller 500. The carrying unit 100 may includes a driving unit 120 for generating power and a traveling unit 110 that uses the generated power to move the mobile unit 1000, for example. Also, the carrying unit 100 may also include a distance calculating unit 130 for calculating how far the mobile unit has moved.

In order to control the carrying unit 100 to operate, direction and distance, information may be required. This information includes information that is generated by the path generator 540, based on the information received from the sensor unit 200, for example.

As an example, position information about an obstacle and a wall may be gathered by the sensor unit 200 and transmitted to the controller 500. The controller 500 may then give a command to the carrying unit 100 to operate the traveling unit 110. The controller 500 may act as a mediator, collecting information from the respective elements and actuating other elements based on this information.

Because they are connected, the traveling unit 110 may thereby move the carrying unit 100, which in turn moves the mobile unit. The traveling unit 110 can have wheels, a caterpillar, or four robotic legs, but is not limited to the same.

The driving unit 120 may transmits power to the traveling unit 110 and controls the direction thereof. The driving unit 120 may further include a steering unit 122 and a power transmission unit 124, for example. An embodiment of the power transmission unit 124 may be a motor that converts electric energy into mechanical energy. The steering unit 122 may guide the direction of motion by controlling the direction of the traveling unit 110. The direction can be guided by controlling the direction of one traveling unit 110. In addition, if the traveling unit is wheels, the direction can be controlled by changing the rotation velocity of both wheels, or different wheels, again noting that embodiments of the present invention are not limited thereto The distance calculating unit 130 may calculate how far the traveling unit 110 has moved. In one embodiment, the distance moved may be calculated by counting the number of rotations of the right and left traveling units 110 and multiplying the count by the circumference of the traveling unit 110. Also, the distance calculating unit 130 may complement the calculation of the distance moved. Specifically, the distance moved may be calculated by knowing the angle of the steering unit and the counted number of rotations of the motor. The distance calculating unit 130 may then calculate the distance moved by using the distance information of the driving unit 120 and the actual distance information obtained by the traveling unit 110.

The operation executing unit 300 may perform a desired operation of the mobile unit 1000. For example, if the mobile unit 1000 is a humidifier, a humidification operation may be provided. If the mobile unit 1000 is an air cleaner, an air cleaning operation may be provided. If the mobile unit 1000 is a vacuum cleaner, a vacuum cleaning operation may be provided. In addition, the operation executing unit 300 may selectively include an operation whose performance is improved during movement.

The user interface 400 may receive operation selection information from a user, for example, and outputs current state/operation information. The user interface 400 may receive an input signal from a remote controller, or a operation key or input button that is mounted on the mobile unit 1000, for example. In order to output information, a display window may be mounted on the mobile unit 1000. If the output information is simple, the display window may be a light emitting device such as a light emitting diode (LED).

Figure 6:
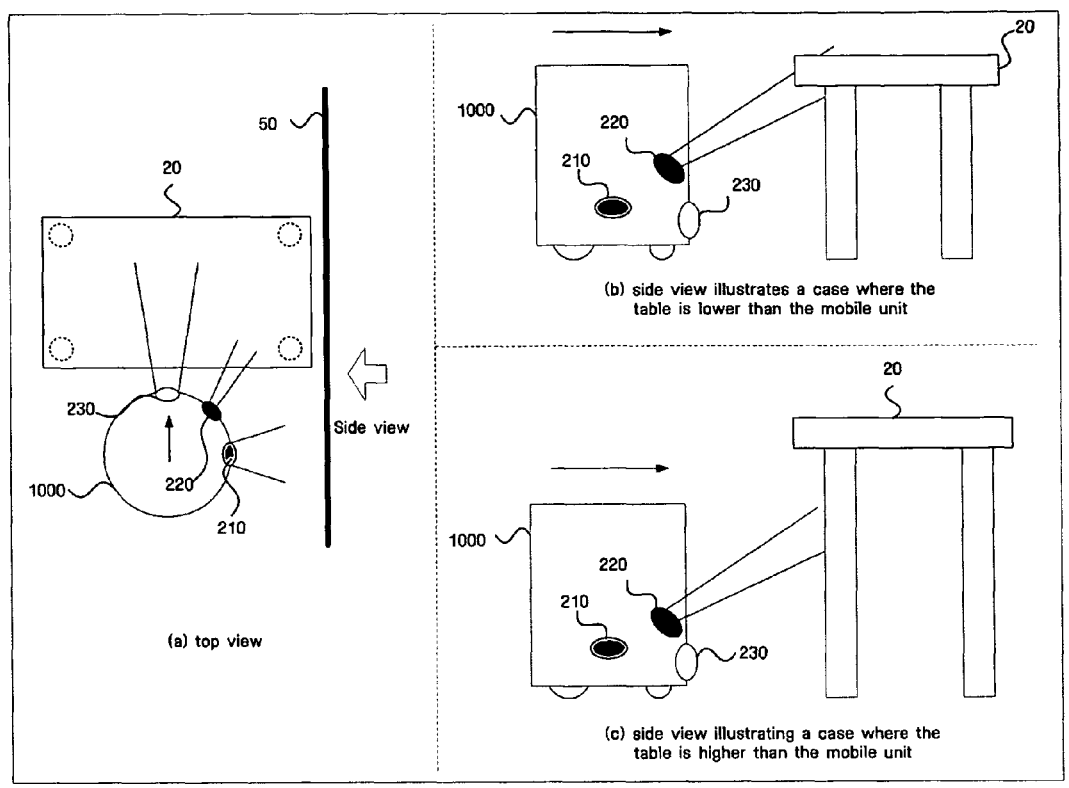
FIG. 6 illustrates an obstacle detecting operation, in accordance with an embodiment of the present invention.

FIG. 6 illustrates processes of detecting an obstacle, through several views, in accordance with an embodiment of the present invention.

View (a) of FIG. 6 is a top view illustrating the case where a table 20 exists in the path of the mobile unit 1000, which is moving while maintaining a predetermined distance from a wall 50. Since a gap between legs of the table 20 is sufficiently wide, the obstacle sensor unit 210 of the mobile unit 1000 may not detect the table 20.

Further, view (b) of FIG. 6 is a side view illustrating the case where the table 20 is lower than the total height of the mobile unit 1000. It can be seen that the table 20, which may be detected by the upward sensor unit 220, is lower than the total height of the mobile unit 1000. If the height of the detected object is transmitted to the controller, through the sensor signal processor 290, the obstacle avoidance unit 510 may determine if the object is higher than the mobile unit 1000. The obstacle height calculation will be described in greater detail below with reference to FIG. 8. If the detected object is lower than the height of the mobile unit 1000, the obstacle avoidance unit 510 can perform an avoidance operation, such as that of FIG. 3, so as to avoid the obstacle.

View (c) of FIG. 6 is another side view illustrating the case where the table is higher than the mobile unit 1000. It can be seen that the table 20, detected by the upward sensor unit 220, is higher than the mobile unit 1000. If the height of the detected object is transmitted to the controller, through the sensor signal processor 290, the obstacle avoidance unit 510 can determine if the object is higher than the mobile unit 1000. Since the detected object is higher than the mobile unit 1000, the object may not be considered an obstacle, so the mobile unit 1000 may continue to follow the wall.

Figure 7:
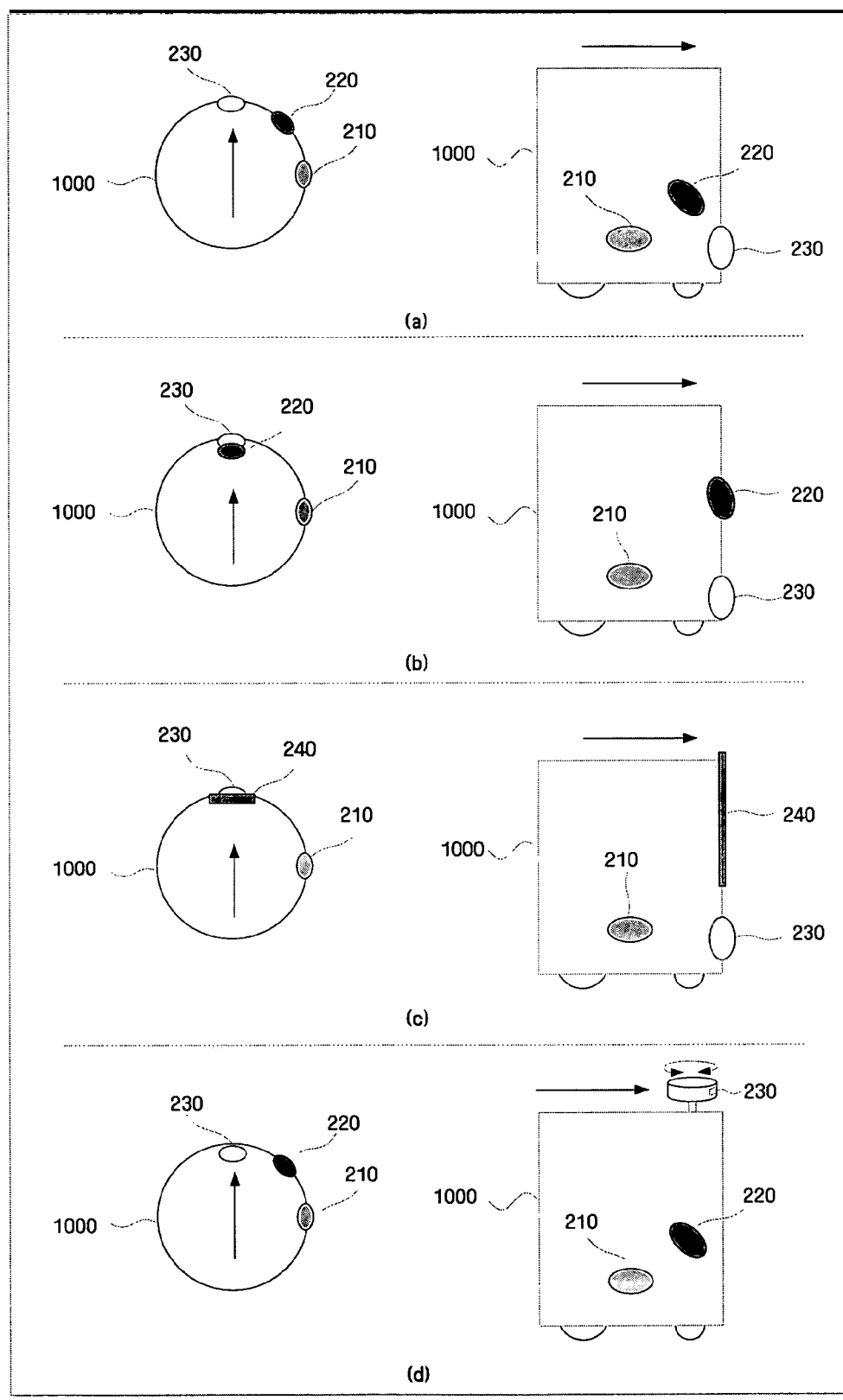
FIG. 7 illustrates sensor arrangements, in accordance with an embodiment of the present invention.

FIG. 7 illustrates different views of different sensor arrangements, in accordance with embodiments of the present invention.

In view (a) of FIG. 7, the upward sensor unit 220 can be installed along a position diagonal to the obstacle sensor unit 230. The obstacle sensor unit 230 can detect objects in the path of the mobile unit 1000, and the upward sensor unit 220 can detect objects above and to the right. The right wall sensor unit 210 may allow the mobile unit 1000 to follow a wall to the right of the mobile unit 1000.

In view (b) of FIG. 7, the upward sensor unit 220 can be installed above the obstacle sensor unit 230. The obstacle sensor unit 230 can detect objects in front of the mobile unit 1000 and the upward sensor unit 220 can detect objects above the intended path of the mobile unit. The wall sensor unit 210 then would allow the mobile unit 1000 to move while maintaining a predetermined distance from a wall to the right.

In view (c) FIG. 7, the collision sensor unit 240 may be mounted on the front side of the mobile unit 1000, and may be used instead of the upward sensor unit. Since the mobile unit 1000 moves in a room, such as a living room, an office, or others, it may travel at low speeds. Accordingly, instead of the upward sensor unit, the collision sensor unit 240 may be used. In forward movement, the obstacle sensor unit may detect objects in front of the mobile unit 1000. In the case of a collision with a table or a chair, the collision sensor unit 240 may detect the collision and cause the mobile unit 1000 to move in a different direction. If the mobile unit's velocity is low, any collision will be minimal. Therefore, the mobile unit 1000 may easily move in a different direction after the collision. Even if the obstacle sensor unit 230 does not detect the table, the collision sensor unit 240 may easily detect a collision with the table.

In view (d) of FIG. 7, the obstacle sensor unit 230 may be rotatable. Here, this rotation corresponds to the rotation of the sensor unit. Accordingly, in operations S204 to S262 of FIG. 3, for example, the sensor unit may rotate and then detect an obstacle. Accordingly, the obstacle sensor unit 230 may be mounted in the same position as the obstacle sensor units shown in views (a)-(c) of FIG. 7.

Figure 8:
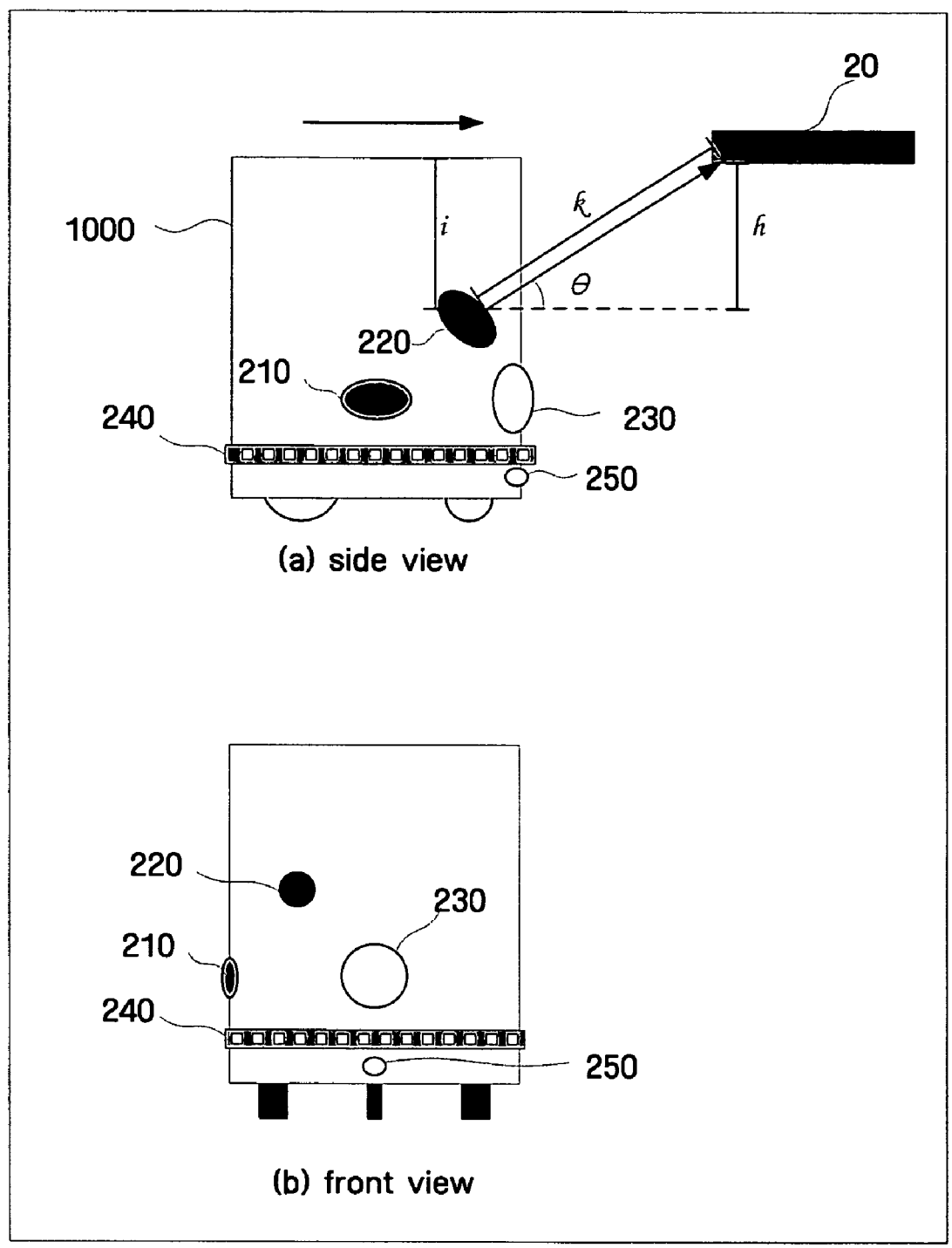
FIG. 8 illustrates a sensor arrangement and an operation of an upward sensor, in accordance with an embodiment of the present invention.

FIG. 8 illustrates an arrangement of a sensor unit, and an operation of the upward sensor unit 220, in accordance with an embodiment of the present invention.

The wall sensor unit 210, the upward sensor unit 220, and the obstacle sensor unit 230 may be installed based on the arrangement shown in view (a) of FIG. 7, for example. Also, the collision sensor unit 240 and the crash sensor unit 250 may also be installed.

View (a) of FIG. 8 illustrates a right side view of the mobile unit 1000. The upward sensor unit 220 may detect a signal reflected from the table and calculate the distance k to the table. Using distance k, and an incident angle of a signal reflected from the table 20, or an angle $\theta$ of a signal transmitted from the upward sensor unit 220, the height of the table h (with respect to the upward sensor) can be calculated. Specifically, applying basic trigonometry: $h = k \cos \theta$.

Since the distance i from the upward sensor unit 220 to the top of the mobile unit 1000 may be previously stored, the probability of a collision can be known by comparing the height h and the distance i of the detected table 20. If h>i, the table 20 is higher than the mobile unit 100 and no collision would occur. However, if h<i, then the table would be lower than the mobile unit and a collision would be possible.

In views (a) and (b) of FIG. 8, the collision sensor unit 240 and the crash sensor unit 250 are further illustrated. As can be seen in views (a) and (b) of FIG. 8, the collision sensor unit 240 may be configured with small on/off sensors which may surround the mobile unit. When the mobile unit collides with an object, the on/off sensors may inform the sensor signal processor 290 of the collision. Also, as shown in view (c) of FIG. 7, the collision sensor unit 240 may be installed only on the front side of the mobile unit.

Since the crash sensor unit 250 may scan the status of the floor, it can be installed in a position close to the floor. Also, in order to correctly detect the height of the floor, the crash sensor unit 250 may be installed in an upper area of the mobile unit. In one embodiment, when the crash sensor unit 250 transmits a specific signal toward the floor and detects the reflected wave, the floor can be considered to be uneven if the reflected wave is not constant. Even when an object, such as a stair or a doorstep, is not detected by the obstacle sensor unit 230, it may be detected by the crash sensor unit 250. When a crash down stairs or the like is probable, the controller 500 may change the direction of travel to avoid the obstacle.

Figure 9:
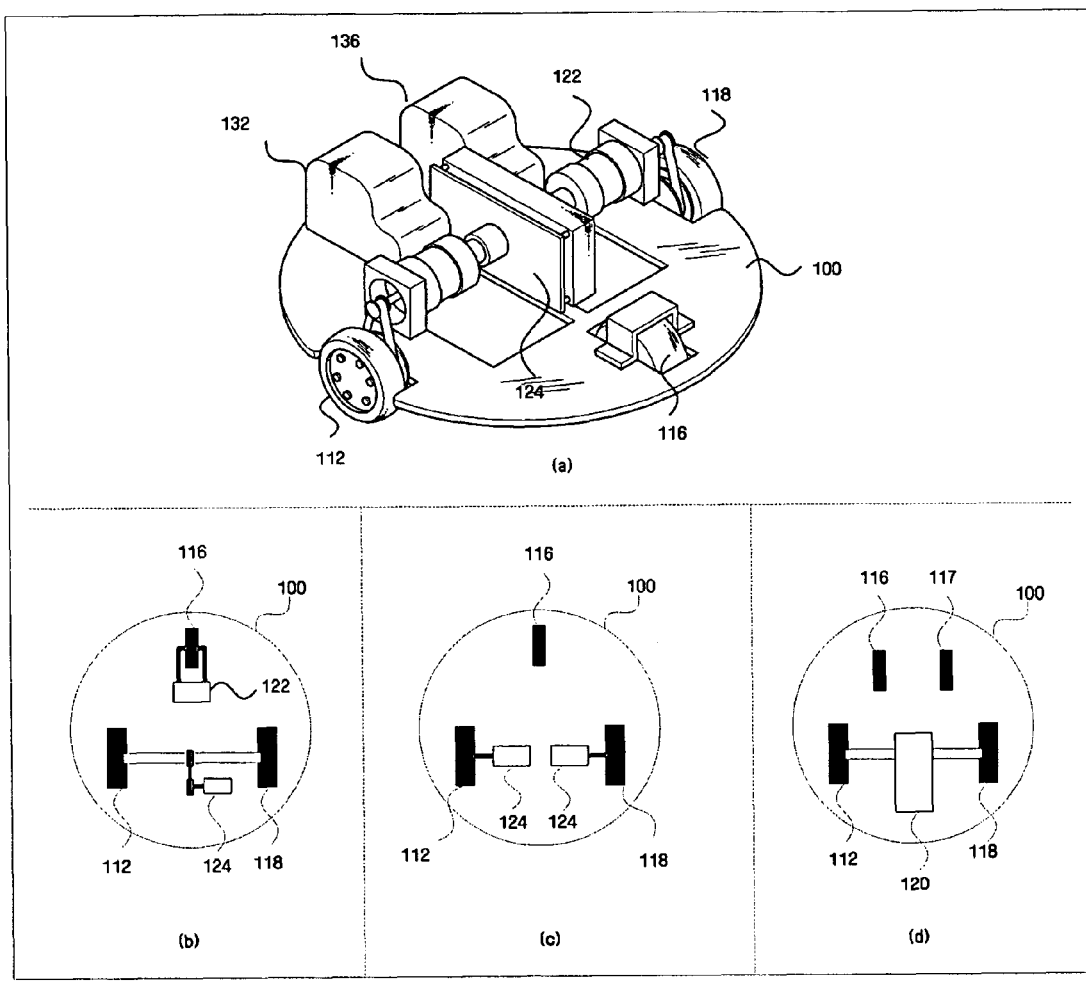
FIG. 9 illustrates a carrying element for moving the mobile unit, in accordance with an embodiment of the present invention.

FIG. 9 illustrates several views of arrangements for the carrying unit 100, which moves the mobile unit, in accordance with an embodiment of the present invention.

View (a) of FIG. 9 illustrates components of the carrying unit 100, according to an embodiment of the present invention.

The traveling units 112, 116 and 118 may move the carrying unit 100, which in turn moves an air cleaner, for example. The traveling units 112, 116 and 118 may be wheels, or robotic legs, e.g., four robotic legs, but are not limited to the same.

The driving unit 120 may transmit power to the traveling units 112, 116 and 118 and controls their respective direction. The driving unit 120 may include a steering unit 122 and a power transmission unit 124. The power transmission unit 124 may include a motor that converts electric energy into mechanical energy. The steering unit 122 may steer the mobile unit by controlling the orientation of the traveling unit 116. The direction may be guided by controlling one of the traveling units 112, 116, or 118, for example. In addition, although not illustrated in FIG. 2, the moving direction can be controlled by changing a left/right direction of the traveling unit 116.

The distance calculating units 132 and 136 may calculate how far the traveling units 112 and 118 have moved. In one embodiment, the distance moved may be calculated by counting the rotations of the left and right traveling units 112 and 118, and multiplying the count by the circumference of the traveling unit.

View (b) of FIG. 9 illustrates the steering unit and the power transmission unit being independent. The embodiment shown in view (b) of FIG. 9, the steering unit 122 and the power transmission unit 124 may be connected to different traveling units. The steering unit 122 may be connected to the traveling unit 116 and the power transmission unit 124 may transmit power to the other traveling units 112 and 118.

View (c) of FIG. 9 further illustrates the traveling units being steered only by the power transmission unit. The power transmission units 124 may be respectively connected to the traveling units 112 and 118 and change the direction by controlling velocity of both the traveling units 112 and 118. For example, if the mobile unit 1000 is to move left, the moving direction may be changed by making the rotation velocity of the right traveling unit 118 greater than the left traveling unit 112, for example.

View (d) of FIG. 9 illustrates the steering unit and the power transmission unit being conjoined. The steering unit and the power transmission unit may be installed inside the driving unit 120. Movement and change of direction may be achieved by the traveling units 112 and 118, similar to the arrangement of view (a) of FIG. 9.

Figure 10:
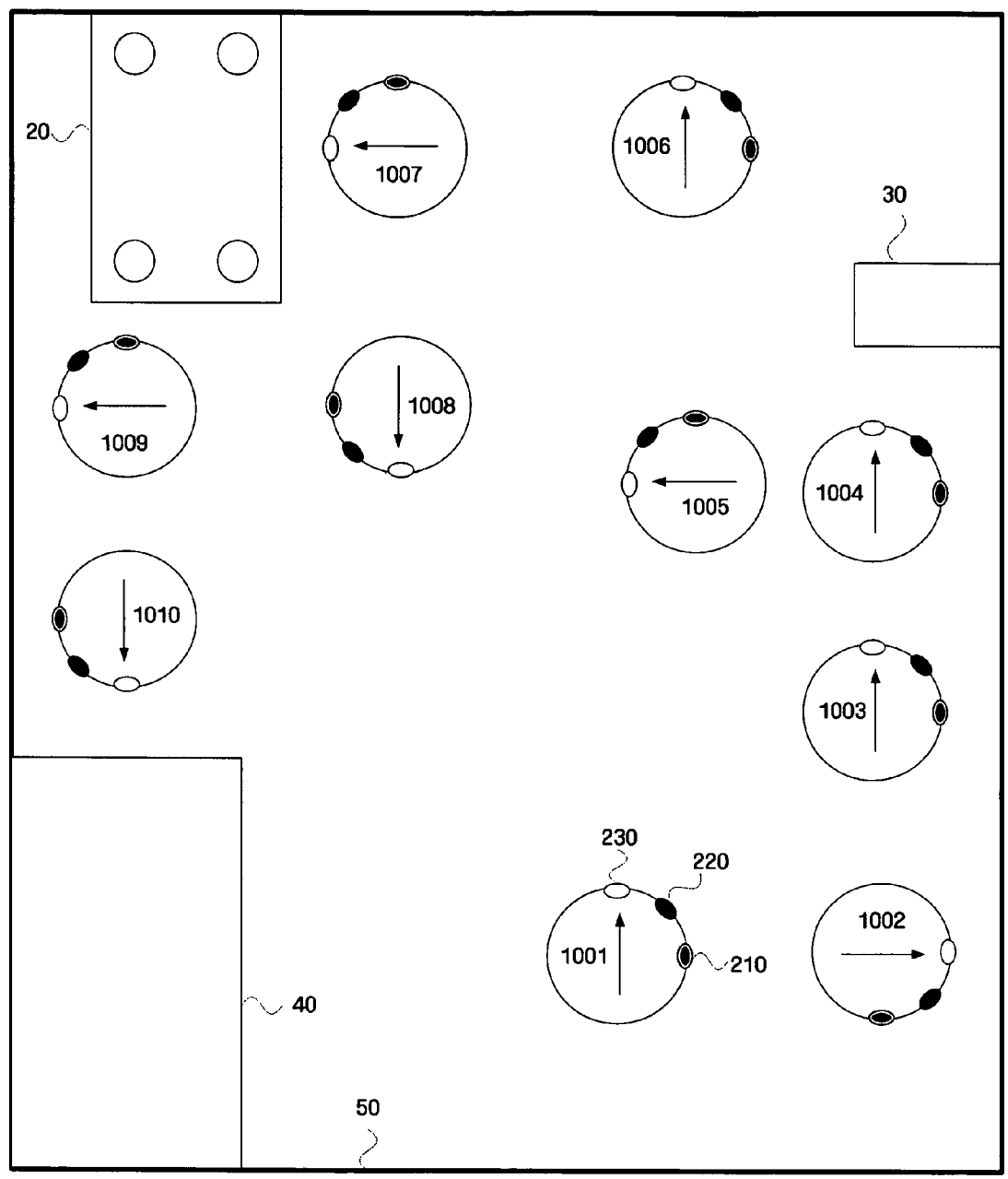
FIG. 10 illustrates a moving operation for the mobile unit, in accordance with an embodiment of the present invention.

FIG. 10 illustrates moving examples of the mobile unit, in accordance with an embodiment of the present invention.

Detailed terms of the mobile unit may be similar to those described in view (b) of FIG. 1. For clarity, reference numerals of the sensor units are only displayed for mobile unit 1000 at position 1001, with similar reference numerals, for other illustrated positions, being omitted. The illustrated arrows represent the respective direction of motion of the mobile unit, and numbers 1001 to 1010 represent different positions of the mobile unit.

Here, FIG. 10 illustrates the mobile unit in motion in a room surrounded by walls 50, and having a table 20, a box 30, and a bed 40. Referring to FIG. 10, the mobile unit 1000 may detect the wall 50 at a first position 1001. The mobile unit may detect the right wall 50 through the wall sensor unit 210 and may move to a position 1002. At this point, the mobile unit approaches the wall 50 until the mobile unit is a predetermined distance from the wall, by using the obstacle sensor unit 230, which may be installed on the front side of the mobile unit. Then, as shown in positions 1003 and 1004, the mobile unit can follow the wall while maintaining the predetermined distance from the wall. The wall sensor unit 210 can be used to maintain the distance from the wall, and detect the distance from the wall during the movement to keep the mobile unit from colliding with, or deviating too far from, the wall.

The mobile unit, at position 1004, may detect the box 30 through the obstacle sensor unit 230. In order to avoid the box, the mobile unit may moves in a different direction. If the obstacle avoidance mechanism of FIG. 3 is used, the mobile unit can move left to a position 1005, for example.

The mobile unit again scans for the wall, and if the wall sensor unit 210 detects the right wall the mobile unit moves to a position 1006. Since the position 1006 is within a predetermined range from the wall, the mobile unit can follow the wall. The mobile unit may reach position 1007, and the table 20, which is above the intended path of the mobile unit, may be detected by the upward sensor unit 220. Since a gap between legs of the table is sufficiently wide, the obstacle sensor unit 230 may not detect the table 20. In order to avoid the table 20, the mobile unit moves left to a position 1008 by using an obstacle avoidance algorithm, such as that of FIG. 3.

Here, a process of searching for the wall may be required in order to follow the wall again. If the right wall is detected by the wall sensor unit 210, the mobile unit moves to a position 1009. Then, the obstacle sensor unit 230 is used for the wall-following. The controller can control the direction of motion and the velocity of the mobile unit so as to keep it a predetermined distance from the wall. Finally, the mobile unit reaches a position 1010.

In this way the mobile unit can avoid obstacles during wall-following, including obstacles such as a table, a desk, and a window frame.

In addition to the above described embodiments, embodiments of the present invention, and/or aspects thereof, can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The media may also be a distributed network, so that the computer readable code is stored/transferred and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A self-propelled mobile unit, comprising:
   a carrying unit to move the mobile unit;
   a sensor unit to detect an obstacle in front of the mobile unit and a wall to a side of the mobile unit, both with respect to a direction of motion of the carrying unit; and
   a controller to control the carrying unit movement of the mobile unit by generating a path along which the carrying unit is controlled to move, according to a detection result of the sensor unit,
   wherein the controller directs the carrying unit to move the mobile unit while controlling a distance between the mobile unit and the wall, and
   wherein the controller directs the carrying unit to move the mobile unit in a direction free of obstacles if the sensor unit detects an obstacle,
   wherein the sensor unit comprises an obstacle sensor unit to detect the obstacle in front of the mobile unit, a wall sensor unit to detect the wall, an upward sensor unit to detect the obstacle, existing upward with respect to the direction of motion of the carrying unit and a sensor signal processor to process signals from the obstacle sensor unit, the wall sensor unit, and the upward sensor unit, the signals including information about the detected obstacle,
   wherein, when the obstacle sensor unit does not detect the obstacle in front of the mobile unit while the upward sensor unit detects the obstacle in front of the mobile unit, the controller directs the carrying unit to move in a direction different from the direction of motion of the carrying unit corresponding to the detected obstacle if a height of the obstacle detected by the upward sensor unit is determined to be less than a height of the mobile unit.

2. The self-propelled mobile unit of claim 1, wherein the controller directs the carrying unit to move the mobile unit while controlling the distance to be within a predetermined range.

3. The self-propelled mobile unit of claim 1, further comprising an operation executing unit to perform at least one of a humidifying operation, an air cleaning operation, and a vacuum cleaning operation.

4. The self-propelled mobile unit of claim 1, wherein the sensor unit further comprises a collision sensor unit to detect a collision of the mobile unit with the obstacle, and
   wherein the controller directs the carrying unit to move the mobile unit in a direction different from the direction of motion of the carrying unit corresponding to the detected obstacle if the collision is detected by the collision sensor unit.

5. The self-propelled mobile unit of claim 1, wherein the sensor unit further comprises a crash sensor unit to detect an unevenness of a surface, upon which the carrying unit travels, in front of the mobile unit with respect to the direction of motion of the carrying unit, and
   the controller directs the carrying unit to move the mobile unit in a direction different from the direction of motion of the carrying unit corresponding to the detected obstacle, with the detected obstacle being the unevenness of the surface.

6. The self-propelled mobile unit of claim 1, wherein the controller comprises:
   an obstacle avoidance unit to generate a direction and a distance that the mobile unit is controlled to move to avoid the obstacle;

a wall-following unit to generate a direction and a distance that the carrying unit is controlled to move to maintain a predetermined distance from the wall; and a path generator to respectively combine the direction and distance generated by the obstacle avoidance unit and the direction and distance generated by the wall-following unit to generate a control signal to control movement of the carrying unit.

7. The self-propelled mobile unit of claim 6, wherein the controller further comprises an exception processor to generate a direction of motion and distance for finding a wall when the sensor unit does not detect the wall, wherein the path generator produces a control signal to control movement of the carrying unit corresponding to the generated direction of motion and distance for finding the wall.

8. The self-propelled mobile unit of claim 1, wherein the controller controls the carrying unit or the sensor unit to rotate when the obstacle is detected by the sensor unit;

the sensor unit scans for obstacles within a predetermined range from a position after the rotation of the carrying unit or sensor unit; and the controller directs the carrying unit to move in a direction corresponding to the position after the rotation of the carrying unit or sensor when no obstacles are detected by the scan for obstacles.

9. The self-propelled mobile unit of claim 1, wherein the carrying unit comprises:

a driving unit driven by power transmitted from a power source to control the moving direction of the mobile unit;

a traveling unit driven by a driving force transmitted from the driving unit to move the mobile unit in the moving direction controlled by the driving unit; and a distance calculating unit to calculate a distance traveled by the traveling unit.

10. The self-propelled mobile unit of claim 9, wherein the driving unit comprises:

a steering unit to control the moving direction; and a power transmission unit to receive the driving force from the power source.

11. A method of self-propelling a mobile unit with obstacle avoidance during wall-following, the method comprising:

detecting for a wall near the mobile unit;

approaching the detected wall;

moving the mobile unit in a first moving direction while maintaining the mobile unit at a distance from the wall, within a predetermined range;

scanning for an obstacle in the first moving direction;

turning the mobile unit in a first turning direction if the obstacle is detected; and moving the mobile unit in the first turning direction if the first turning direction is obstacle free, wherein the scanning for the obstacle comprises scanning in a direction of motion of the mobile unit and scanning in an upward direction with respect to the direction of motion, and determining whether a height of the obstacle is less than a height of the mobile unit when the obstacle is detected in the scanned upward direction while not being detected in the scanned direction of motion.

12. The method of claim 11, wherein the moving of the mobile unit in the obstacle free direction comprises:

turning the mobile unit in a second turning direction; and scanning for obstacles within a predetermined range in the second turning direction.

13. The method of claim 11, wherein detecting of the obstacle existing in the first moving direction comprises detecting a window, as the obstacle.

14. The method of claim 11, further comprising moving the mobile unit a predetermined distance and scanning for the wall again if the wall is not detected.

15. The method of claim 11, further comprising repeating the scanning for the wall and the approaching of the wall after moving the mobile unit in the first turning direction.

16. The method of claim 11, further comprising repeating the approaching of the wall, after moving the mobile unit in the first turning direction, based on a determination of a position of the repeated approached wall being based on a known direction of movement of the mobile unit and calculating a distance moved in the first turning direction.

17. At least one medium comprising computer readable code to implement the method of claim 11.

18. The self-propelled mobile unit of claim 1, wherein the sensor unit further comprises a window frame sensor unit to detect a window existing in front of or to a side of the mobile unit, with respect to the direction of motion of the carrying unit, and wherein the controller uses a detected position of a detected window to decide if the detected window should be considered an obstacle or a wall, and directs movement of the carrying unit accordingly.

19. The method of claim 11, wherein the detecting of the obstacle existing in the path of the mobile unit comprises detecting a window existing in the first moving direction of the mobile unit.

* * * * *